United States Patent [19]
Baker et al.

[11] Patent Number: 5,793,751
[45] Date of Patent: Aug. 11, 1998

[54] APPARATUS AND METHOD FOR ISDN PROVISION VERIFICATION

[75] Inventors: Albert D. Baker, Lincroft; Charles L. Davidson, Middletown; Ellen Eng, Chatham; Joseph C. Petrilla, Tinton Falls; Lee Alan Vallone, Locust, all of N.J.

[73] Assignee: Lucent Technologies Inc., Murray Hill, N.J.

[21] Appl. No.: 618,059

[22] Filed: Mar. 25, 1996

[51] Int. Cl.$^6$ .................................................... H04J 3/14
[52] U.S. Cl. .......................... 370/250; 370/384; 370/463
[58] Field of Search .................. 395/185.1; 370/241, 370/248, 250, 251, 357, 384, 385, 419, 463; 371/1, 9, 15, 18, 27, 29

[56] References Cited

U.S. PATENT DOCUMENTS

| | | | |
|---|---|---|---|
| 5,195,085 | 3/1993 | Bertsch et al. | 370/250 |
| 5,535,198 | 7/1996 | Baker et al. | 370/426 |

OTHER PUBLICATIONS

ITU–T (previously "CCITT Recommendation") I.411 Standard, dated Mar., 1993, pp. 1–7.
American National Standard For Telecommunications (ANSI) T.601–1992 entitled "Integrated Services Digital Network (ISDN) Basic Access Interface For Use On Metallic Loops For Application On The Network Side Of The NT (Layer 1 Specification)", approved Feb. 21, 1992, by ANSI, Inc.
ITU–T Recommendation Q.931, entitled "Digital Subscriber Signaling System No. 1 (DDSs 1)—ISDN User–Network Interface Layer 3 Specification For Basic Call Control", dated Mar. 1993.
International Telegraph and Telephone Consultative Committee (CCITT), I.430 COM XVIII–R 119–E (Study Group XVIII—Report R 119), dated Jul. 1992, entitled "Recommendations of the I.430–Series Submitted For Approval At the Xth CCITT Plenary Assembly".
International Telegraph and Telephone Consultative Committee (CCITT), COM XI–R 205–E (Study Group XI—Report R 205), dated Jun. 1992, entitled "ISDN User–Network Interface—Data Link Layer Specification".

*Primary Examiner*—Benedict V. Safourek
*Attorney, Agent, or Firm*—Thomas Stafford; Gregory J. Murgia

[57] ABSTRACT

Provisioning a Central Office (CO) Basic Rate Interface (BRI) access is a complex procedure which involves hundreds, and potentially thousands, of parameters that must be asserted to configure the CO for a particular users service profile. In such a complex procedure, errors in the provisioning may be introduced which are difficult and costly to detect and correct. To solve this problem, a provisioning tool which exercises BRI lines i.e., digital subscriber lines (DSLs) from a CO to a premises switch is defined which validates that transport related restrictions and permissions are properly administered at the CO. This is achieved by the system calling itself over such lines, and varying the types (e.g., voice, digital, data, 3.1 kHz audio, et al.) of call attempts that are placed to ensure that all lines support the intended services.

16 Claims, 8 Drawing Sheets

CPE EQUIPMENT CONFIGURATION

| SLOT ID | HID | CO/BRI |
|---------|----------|--------|
| 1 | HEX CODE | Y/N |
| ... | ... | ... |
| N | HEX CODE | Y/N |

FIG. 3

TEST SUITES AND RESULT LOG

| HARDWARE ID (HID) | DN | SPID | CALL TYPE | OUTBOUND | INBOUND | RESULT |
|---|---|---|---|---|---|---|
| | 957-1234 | 019570000000 | SP<br>64Kb/s<br>56Kb/s<br>3.1KHz | SETUP<br>SETUP ACKNOWLEDGE<br>CALL PROCEEDING<br>ALERTING<br>CONNECT<br>DISCONNECT<br>RELEASE<br>RELEASE COMPLETE | SETUP<br>CALL PROCEEDING<br>ALERTING<br>CONNECT<br>CONNECT ACKNOWLEDGE<br>DISCONNECT<br>RELEASE<br>RELEASE COMPLETE | PASS<br>FAIL<br>INCONCLUSIVE<br>N/A |

FIG. 4

FIG. 5
OPERATIONAL SEQUENCE OF TESTING PROCEDURE

FIG. 6

FIG. 7
INITIALIZATION (SPID) FAILURE

FIG. 8
DESTINATION EMULATED TERMINAL NOT PROPERLY PROVISIONED

FIG. 9
ORIGINATING EMULATED TERMINAL NOT PROPERLY PROVISIONED

FIG. 10
ORIGINATION AND DESTINATION EMULATED TERMINALS BOTH PROPERLY PROVISIONED

APPARATUS AND METHOD FOR ISDN PROVISION VERIFICATION

TECHNICAL FIELD

This invention relates to communication equipment and, more particularly, to equipment for interfacing to an Integrated Services Digital Network (ISDN) digital subscriber line (DSL).

BACKGROUND OF THE INVENTION

Central offices known to provide ISDN Basic Rate Interface (BRI) access must be administered to allow access to network services, which include both supplementary and transport services. In a BRI environment, a subscriber may order a mix of transport services relating to channel access (e.g., zero, one or two B-channels), packet data on the D-channel, and various types of transport services on a given B-channel (e.g., speech, 3.1 kHz audio, 64 kb/s data). In addition, the subscriber may be authorized to use a number of supplementary services from a rich assortment of such services. This service mix can vary between service providers, between different offices of a given provider, and indeed between different subscribers served by a given central office (CO). The consequence of this is that the provisioning of a central office BRI service may involve the manipulation of literally hundreds of parameters. In such an environment, errors may be introduced into the provisioning which prevent the proper operation of a communications equipment. Such errors are difficult and costly to detect, given the complexity of the interface and provisioning.

SUMMARY OF THE INVENTION

The problems with determining whether or not a given BRI is properly administered are overcome by creating an equipment based test which systematically examines all network attached BRI lines, i.e., digital subscriber lines (DSLs) and attempts to place calls to and from each line in turn and in combination. By placing calls from one system attached BRI to another system attached BRI, the system is able to monitor call progress at both ends of the call. Further, call attempts are initiated using different Bearer Capability assertions during such attempts in an effort to determine which capability types are supported on each line. As call setup attempts are made by the system, the provisioning tool records the results. These results and analysis thereof are made available to the operator, who can then initiate procedures to correct detected problems.

DETAILED DESCRIPTION

Figure 1:
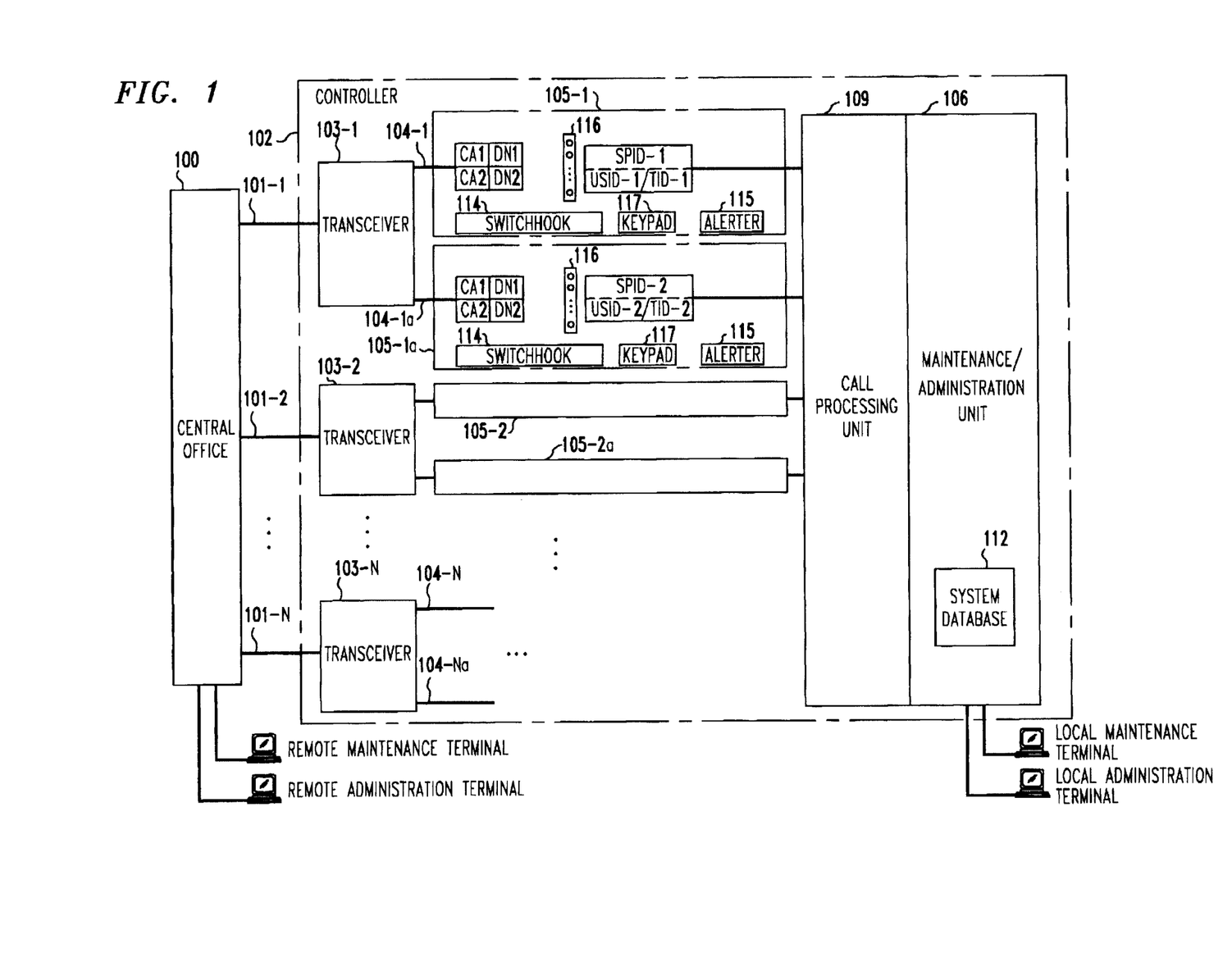
FIG. 1 shows in simplified block diagram form a system employing an embodiment of the invention.

FIG. 1 shows in simplified block diagram form, a system arrangement employing an embodiment of the invention. Shown is central office (CO) 100 which is arranged to provide Centrex features and capabilities. However, it will be apparent that the invention may be employed with any CO (e.g., 5ESS switch, DMS, etc.) having the ISDN-BRI whether or not Centrex services are also available. Central office 100 is connected via a plurality of digital subscriber lines 101-1 through 101-N to controller 102, which may for example, be customer premises telephone switching equipment (CPE). Controller 102 includes a similar plurality of transceivers 103-1 to 103-N for interfacing DSLs 101-1 through 101-N. In this example, transceivers 103-1 and 103-2 are U interface point transceivers and transceiver 103-N is an S/T reference point transceiver. Such transceiver arrangements are well-known in the art. Each of transceivers 103 provides an electrical connection to a corresponding one of DSLs 101 and provides the mechanism to emulate a passive bus 104. Also shown are software emulated CO station terminals 105-1 and 105-1a connected via passive bus connections 104-1 and 104-1a to transceiver 103-1. Note that bus 104 is a virtual passive bus and is not a physical collection of connections but functionally provides the same result.

Each of emulated CO station terminals 105-1 and 105-1a includes virtual call appearances CA-I and CA-2, and a service profile identifier (SPID). As will be described below, during system startup each of the emulated CO station terminals 105 transmits a SPID to central office 100 to identify each of emulated CO station terminals 105 as a legitimate termination on the passive bus 104. That is to say, each of emulated CO station terminals 105 appears as a physical ISDN BRI terminal to central office 100. Upon recognition of the SPID central office 100 will transmit to emulated CO station terminals 105 a user service identifier (USID) and associated terminal identifier (TIED). Information from each of the emulated CO station terminals 105 is supplied to and from administration/mapping unit 106. Furthermore, each of emulated CO station terminals 105 includes virtual switchhook 114, virtual alerter 115, virtual light emitting diodes (LEDs) 116 and virtual keypad 117. Virtual switchhook 114 is that which is associated with a traditional is telephone instrument. In addition, signaling elements used to control an alerting device, typically included in a physical station terminal are captured by each of emulated CO station terminals 105 via virtual alerter 115 and mapped to the local system data base 112. It is noted that the virtual, switchhook 114 and keypad 117 messaging operations are delivered up-link to the central office 100, while the virtual CA1, CA2 and alerter 115 may be delivered down-link from central office 100.

Each of emulated CO station terminals 105 provides access to one or more directory numbers (DNs). Although each of emulated CO station terminals 105, for example, comprised of 105-1 and 105-1a, are shown as supporting two (2) voice channels, it should be noted that they can support the known normative eight (8) channels, where the additional six (6) channels are packet channels. Thus, by employing the two emulated CO station terminals to terminate the corresponding DSL 101, two voice channels are obtained per DSL 101 instead of just one. That is, each of emulated CO station terminals 105 provides access to one B channel of channel service. Additionally, each of emulated CO station terminals 105 extracts call related and non-call related signaling from an incoming D channel signaling service and provides the extracted signaling information to controller 102. Each of emulated CO station terminals 105 also supplies outgoing call related and non-call related signaling information into an outgoing D channel.

It is noted that the signaling service is transported on the BRI D channel. The signaling service includes call control related information, call typing information and call related information. Examples of call control related information are call establishment and disestablishment messages. Call typing information is exemplified by the bearer capability and high layer compatibility and low layer compatibility information elements. Call related information is typified by calling party name and calling party number information elements. It is further noted that all of these signaling service elements are well known in the art.

Note that when transceiver 103-N is an S/T transceiver, then controller 102 operates as a member terminal on a passive bus 104 connected to DSL 101-N. The S and T reference points are defined by the ISDN User-Network Interface Reference Configurations described in the ITU-T (previously "CCITT Recommendation") I.411 Standard, dated March, 1993, pages 1–7 and the U interface point is defined in American National Standard for Telecommunications (ANSI) T1.601-1992 entitled "Integrated Services Digital Network (ISDN) Basic Access Interface for Use on Metallic Loops for Application on the Network Side of the NT (Layer 1 Specification)" and approved Feb. 21, 1992 by the American National Standards Institute, Inc.

Figure 2:
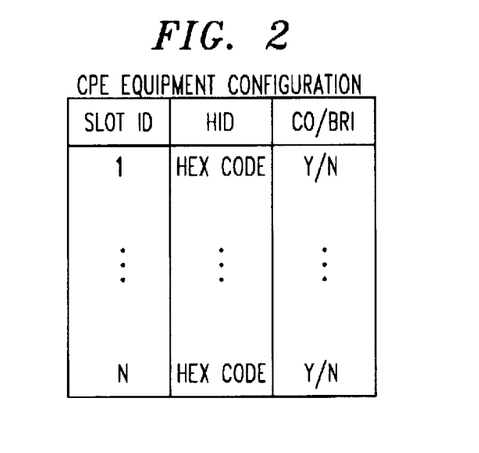
FIG. 2 is a table illustrating a view into the controller's system database showing the data relationships between circuit board slots, hardware identifications (HID) and circuit board type (BRI or not)

FIG. 2 describes the configuration of the CPE equipment and the determination of capability to initiate the BRI provisioning test. The CPE is arranged with N circuit board slot IDs, each of which may contain some facility hardware identified by unique hardware IDs (HID). The order and type of facility hardware contained in a particular slot is flexible. The HID is used to identify that a particular slot contains BRI facility hardware. It is only on this hardware that the BRI provisioning test can be applied.

Figure 3:
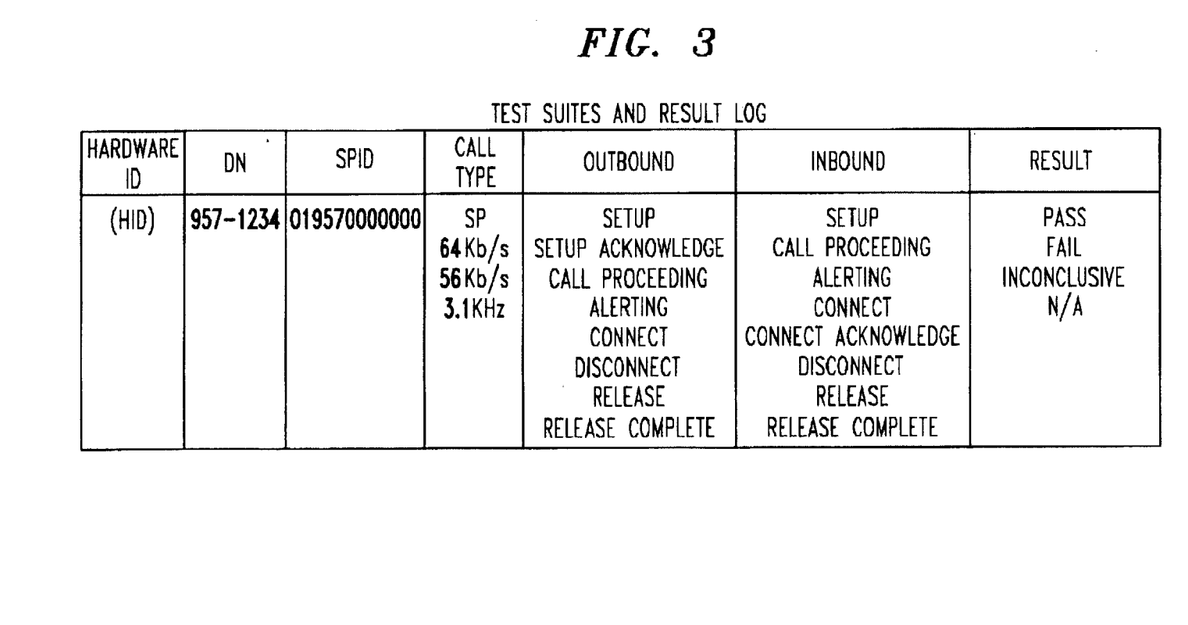
FIG. 3 is a table illustrating a view into the controller's system database showing the data relationships being mapped from each DSL and its transport service.

FIG. 3 describes the internal data store used both to determine the capability of BRI facilities for a given BRI circuit board slot and to store results for a combination of call types placed over the BRI facilities. For a given BRI circuit board slot, as determined by the HID, a check is made as to whether the individual DSL's (both DNs) on the circuit board slot have proper administration, which on the CPE comprises a SPID/DN pair. By way of an example, in FIG. 3 the DN is shown as 957-1234 and the SPID is shown as 019570000000. For each DN on each DSL, a set of test calls is made transmitted (outbound) and received (inbound) using a variety of call types (e.g., speech (SP), 64 kb/s, 56 kb/s, 3.1 kHz audio,). For each such outbound call, examination is made of proper call state transitions initiated by known call control messages, for example, SETUP, SETUP ACKNOWLEDGE, CALL PROCEEDING, ALERTING, CONNECT, DISCONNECT, RELEASE and RELEASE COMPLETE. Similarly, for each such inbound call, examination is made of proper call state transitions initiated by known call control messages, for example, SETUP, CALL PROCEEDING, ALERTING, CONNECT, CONNECT ACKNOWLEDGE, DISCONNECT, RELEASE and RELEASE COMPLETE. Recording of the success or failure of each call is made in the data store 112 (FIG. 1) for later examination. Note that the result of each of the test suites shown in FIG. 3 for each call type, include, for example, PASS, FAIL, INCONCLUSIVE or NOT/APPLICABLE (N/A). Thus, by way of an example, the SETUP test for an outbound call may yield any of the results, namely, PASS, FAIL, INCONCLUSIVE or N/A. Note other call state transitions may result from call control messages as set forth in ITU-T Recommendation Q.931 entitled "Digital Subscriber Signaling System No. 1 (DDSs 1) - ISDN User-Network interface Layer 3 Specification For Basic Call Control", dated March 1993.

Figure 4:
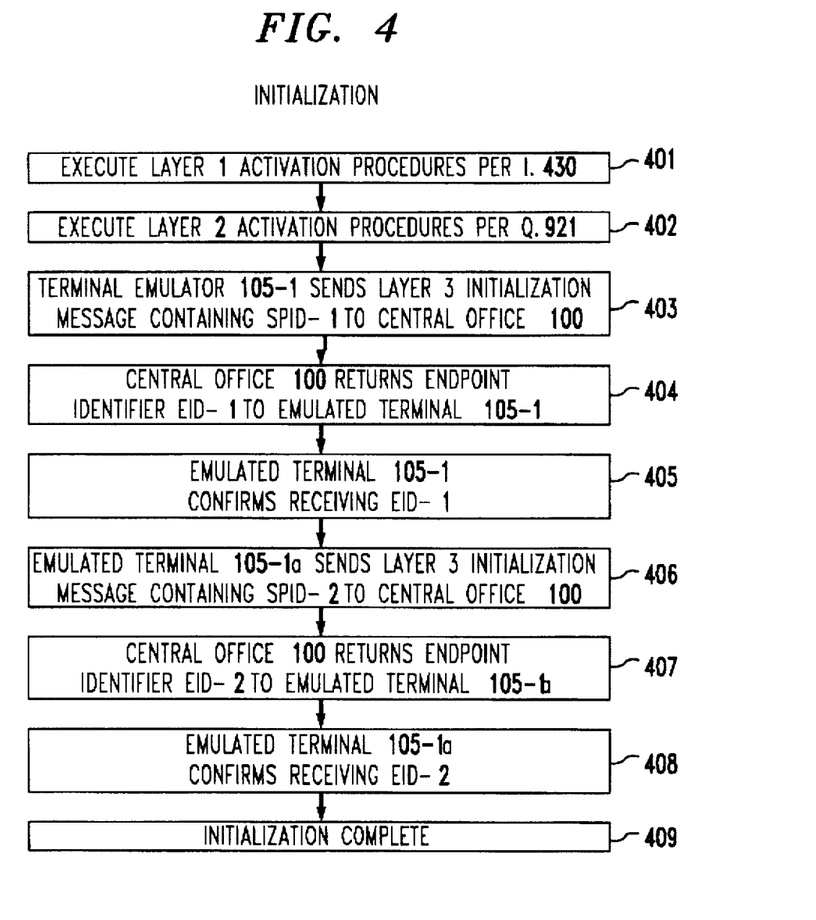
FIG. 4 is a flow chart illustrating the CO initialization procedures executed by the emulated CO station terminal.

FIG. 4 depicts an initialization sequence executed by the system controller 102. Upon connection of the system controller 102 to the central office 100, the layer 1 activation procedures, as defined in I.430 COM XVIII-R 119-E (Study Group XVIII Report R 119) dated July 1992 entitled "Recommendations of the I.430-Series Submitted for Approval at the Xth CCITT Plenary Assembly" are executed via 401. Upon successful execution of the activation procedures, layer 2 is notified and begins execution of standard data link layer activation procedures via 402, as defined in Revised Recommendation Q.921 COM XI-R 205-E (Study Group XI - Report R 205) dated June 1992 and entitled "ISDN User-Network Interface - Data Link Layer Specification". After activating both layers 1 and 2, the layer 3 initialization sequence begins and emulated CO station terminal 105-1 sends via 403 a layer 3 initialization message to the network containing SPID-1 on DSL-101-1, for example. Note that the two initializations per DSL 101 can occur sequentially where each emulated CO station terminal 105 requests and completes the initialization procedure prior to any of the others of the emulated CO station terminals 105 doing so. Alternatively, the initializations for a number of emulated CO station terminals 105 can occur simultaneously. Upon receipt of this SPID- 1 message, central office 100 accesses its internal database to validate SPID-1 on DSL 101-1. Having successfully validated this SPID-1 on this DSL 101-1 the central office 100 returns via 404 an endpoint identifier (EID) to the originating emulated CO station terminal 105-1 where the endpoint identifier contains the USID-1/TID-1, i.e., EID-1=USID-1/TID-1. Emulated CO station terminal 105-1 confirms receiving the initialization response by returning the EID-I to central office 100 via 405, if required. This completes the initialization process for emulated CO station terminal 105-1. In order to initialize, the second emulated CO station terminal 105-1a on virtual passive bus 104-1a, execution of the initialization procedures described above commences by sending a layer 3 initialization message containing SPID-2 via 406 to central office 100 and receiving via 407 endpoint identifier 2 (EID-2). Emulated CO station terminal 105-1a confirms receiving the initialization response by returning EID-2 via 408 to central office 100, if required, and it stores EID-2 for future reference. The initialization procedure is completed by 409 and central office 100 now believes that it has two direct attached physical ISDN BRI terminals operating in passive bus mode each with a unique identifier USID-1/TID-1, and USID-2/TID-2 respectively. It is noted that the initialization procedure, as described above, is the same for the emulated CO station terminals 105 associated with each of DSLs 101.

Figure 5:
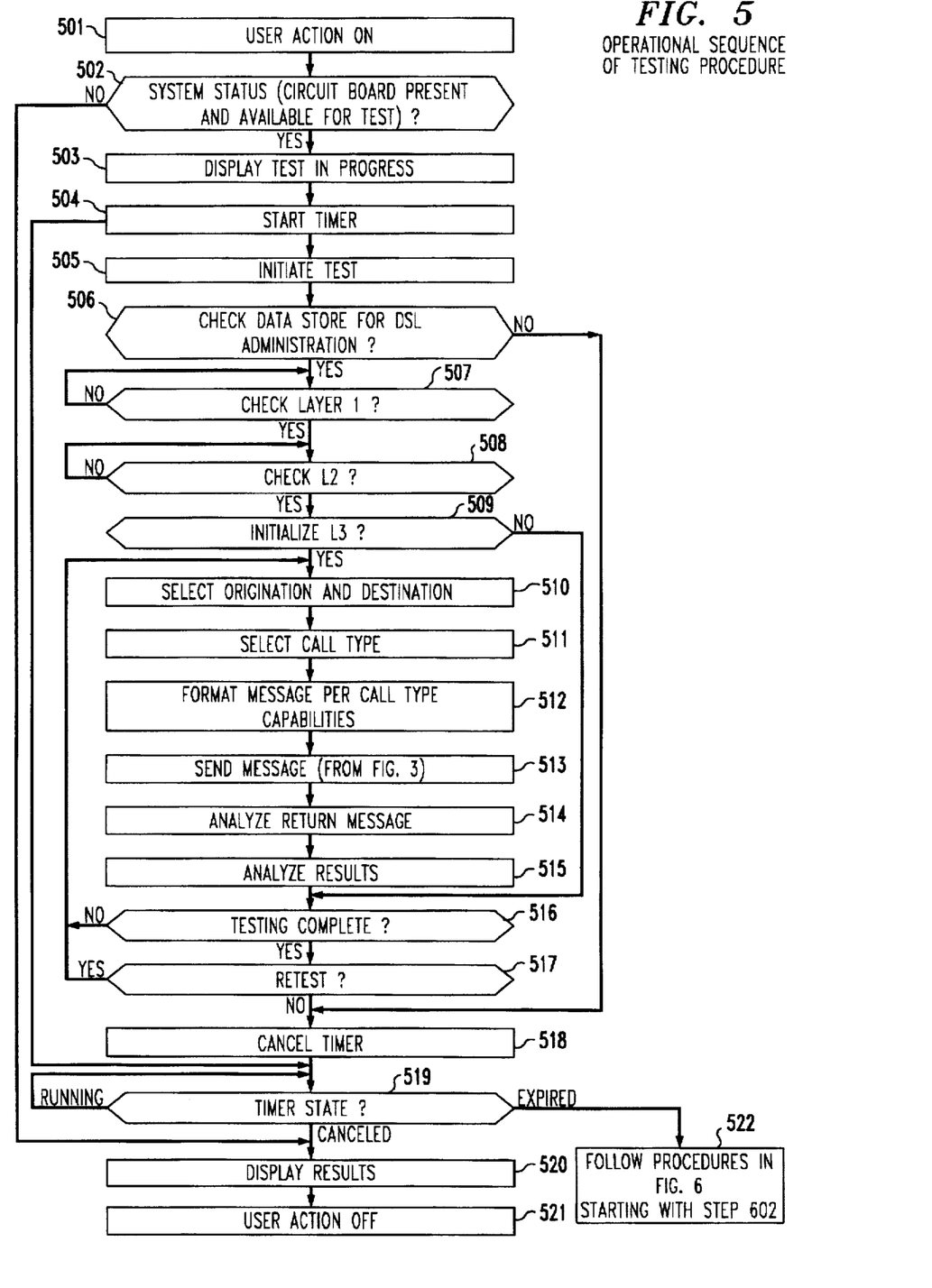
FIG. 5 is a flow chart illustrating the procedures executed during a test of the CO provisioning.
Figure 6:
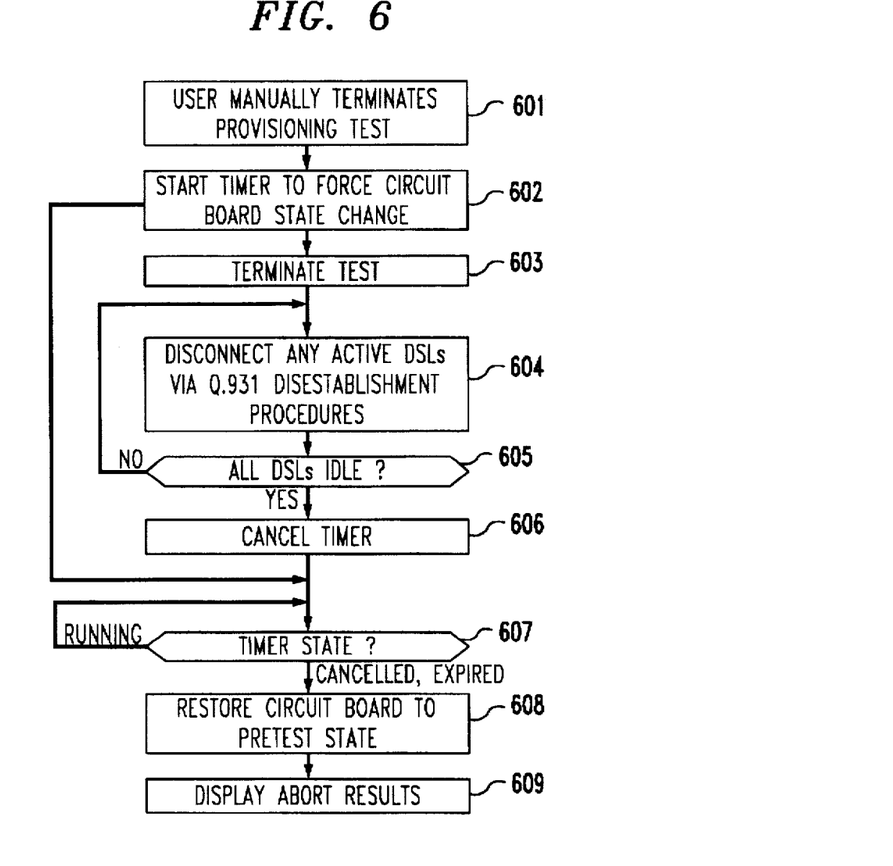
FIG. 6 is a flow chart illustrating the procedures associated with manually aborting a test of the CO provisioning.

FIG. 5 is a flow chart which depicts the operational sequence of the provisioning testing procedure. As shown, the test procedure begins with a user taking some action via 501 at an originating emulated CO station terminal, at either a local or remote administration or maintenance terminal (FIG. 1). If the circuit board that has been selected is identified in step 502 in data base 112 as a BRI 104 and associated emulated terminals 105, then the tester determines if the circuit board is in the correct state by checking its status in data base 112. If the result of the status check in step 503 is NO and the test cannot be initiated, a message is sent to CPU 109 and a message indicating the test results is displayed via 520. If the result of the status check in step 502 is YES, the test can proceed and a message indicating the test is in progress is sent to CPU 109 and displayed. A safety timer is started in step 504, running in parallel, which protects against a possible runaway test. The state of the timer is checked in step 519. If the timer has been canceled, control is passed to step 520 which causes the test results to be displayed and, additionally, causes the circuit board under test to be restored to its pretest state. If the test is not completed in the allocated interval of the timer as determined in step 519 and the timer has expired control is transferred to step 522 and the abort procedure described below in conjunction with FIG. 6 is followed beginning with step 602.

Returning to step 505, when the CPU 109 receives the stimulus to initiate the provisioning test on each of the BRI lines on DSLs 101, it determines via 506 from the system database 112 if any of their associated emulated CO station terminal 105 can be activated, i.e., were previously administered with a SPID and DN(s). If none of emulated CO station terminals 105 can be activated, the provisioning test ends with the appropriate error code for each BRI line. This is realized by transferring control to 518 which cancels the timer. Then control is passed through 519 to step 520 which displays the appropriate results. Emulated CO station terminals 105 are a vehicle for the testing of the associated BRI lines. Therefore, BRI lines 104 and emulated CO station terminals 105 may be used interchangeably.

Layer 1 activation procedures are performed on each administered DSL 101. Upon reaching synchronization at layer 1, as indicated by a YES result in step 507, layer 2 establishment is attempted on each BRI line on DSL 101. Following successful establishment at layer 2, as indicated by a YES result in step 508, the layer 3 initialization sequence begins as illustrated in FIG. 4. The response of central office 100 to the SPID from the originating emulated CO station terminal 105 determines if testing on the associated BRI line continues or ends.

As each emulated CO station terminal 105 is initialized, it is made available for pairing up with another emulated CO station terminal 105 that is initialized, available for testing, and presumably similarly provisioned. This pairing is effected in step 510 by selecting an origination emulated terminal 105 and a destination emulated terminal 105. The provisioning information for a line is stored in the system database 112. Emulated CO station terminals 105 are assigned test suites similar to that in FIG. 3 that will ascertain whether the provisioning on their associated BRI line allows all expected possible call scenarios. One emulated CO station terminal 105 is assigned a test suite, and its partner is assigned the complementary test suite.

The test suites in FIG. 3 coordinate the testing between two emulated CO station terminals 105, as they establish the test sequence and procedures to be executed. Call origination occurs from either emulated CO station terminal 105 with termination at the other emulated CO station terminal 105. The call type is selected in step 511. Again, examples of call types are shown in FIG. 3. Similarly, initiation of call disconnect occurs from either of the emulated CO station terminals 105. Calls of different (supported and unsupported) bearer capabilities are tested, as well as, the call establishment and disestablishment sequences associated with these bearer capabilities. Each test governs the call control messages that are transmitted by the emulated CO station terminal 105 to central office 100, and analyzes the appropriateness of the call control messages received from central office 100 by the emulated CO station terminal 105 under test. The appropriate control messages are formatted in step 512 and sent (from FIG. 3) in step 513 and any return message is analyzed in step 514. Transitions of call states occur accordingly. The testing results are analyzed in step 515. Thereafter, step 516 determines if the testing is complete. Whenever testing ends on a BRI line, a result code providing the most significant information found for that line is generated. The provisioning test is completed when testing ends on all BRI lines under test. If the test result in step 516 is NO, control is returned to step 510 and steps 510 through 516 are iterated until step 516 yields a YES result. Then, step 517 determines whether there should be a retest. If not, control is transferred to step 518, which cancels the timer. If the result in step 517 is YES, control is transferred to step 510 and steps 510 through 517 are iterated until step 517 yields a NO result.

The emulated CO station terminal 105 records the status of each test as well as symptoms of possible problems in a results log in FIG. 3. Placing calls between emulated CO station terminals 105 of the same system 102 allows for monitoring of the call progress at both ends of the call so that CO provisioning can be more accurately analyzed.

Consideration is taken to ensure that any race conditions by the emulated CO station terminals 105 for the B-channel on DSL 101 do not affect the outcome of the tests.

When an emulated CO station terminal 105 completes a test suite, the results are analyzed to determine their conclusiveness and capabilities. If the results are not sufficiently definitive, the emulated CO station terminal 105 may retest with progressively better combinations of qualified emulated CO station terminal(s) 105 as they become available until it is determined that conclusiveness has been achieved or cannot be achieved. Testing with sets of emulated CO station terminals 105, where each emulated CO station terminal 105 helps test what it is best capable of, reduces the time required to effect that decision.

When testing of the provisioning of each BRI line is completed, the provisioning of the DSL 101 is verified if possible. Each of the emulated CO station terminals 105 on a DSL 101 is paired with other qualified emulated CO station terminals 105 to determine if provisioning for the DSL 101 allows the BRI lines to behave predictably. Results of the provisioning testing are displayed via 520.

Upon completion of the desired testing, a user simply terminates the provisioning testing by taking the appropriate user action via 521.

Examples of several testing scenarios are shown in FIGS. 7 through 10 and described below.

FIG. 6 is a flow chart of the sequence of steps taken in a manual abort of the provisioning testing. Note that steps 602 through 609 are also employed in conjunction with step 522 of FIG. 5 in order to terminate the testing when the timing interval set in step 504 has expired.

For a manual abort the user terminates the provisioning test in step 601. A so-called safety timer is initiated in step 602 to force the circuit board under test to change its state.

Note that this timer is running in parallel with the other steps of this abort procedure. This is illustrated by the path from step 602 to step 607. In step 603, the provisioning test is terminated. Thereafter, step 604 causes disconnects of any active DSLs via the Q.931 disestablishment procedures. Note that the Q.931 standard was cited above. Then a determination is made in step 605 whether all the DSLs are idle. If the test result is NO, control is returned to step 604 and step 604 and step 605 are iterated until step 605 yields a YES result. Step 606 causes the timer to be canceled. Thereafter, the state of the parallel running timer is checked in step 607. If it is either canceled or expired, step 608 causes the circuit board under test to be restored to its pretest state. Thereafter, step 609 displays the abort results.

TYPICAL CALL TESTING SCENARIO

First, the operator selects the circuit board to be tested, then "busies out the target" circuit board. The operator then activates the automated tester.

The tester checks circuit board status, and then checks circuit board availability. If active and available, the tester initializes the circuit board (Layers 1,2,3).

After the tester selects the originating "emulated terminal" from the available list on a "first available" basis, it selects the destination "emulated terminal". The tester then Selects a Bearer Capability (BC) type for the current test (for example 'Speech') and initiates call establishment procedures from the originating emulated terminal to the destination emulated terminal using the address of the destination emulated terminal as stored in the system database. The tester then sends a SETUP message, including the BC of the selected BC type (Speech, in this example).

If the network database is not properly administered for the originating emulated terminal BC under test, then the call establishment attempt will be defeated by the network with a RELEASE COMPLETE message. If properly administered, the emulated terminal will receive a SETUP ACKNOWLEDGMENT message. In the current example, if the CO database is correctly administered for Speech, then call establishment will proceed normally. If the CO has not been properly administered, then the response to the attempt to establish a speech call will be defeated, as above.

The tester causes the originating emulated terminal to send the digits of the destination terminal under test in individual INFORMATION (INFO) messages, according to the Q.931 protocol (noted above) procedures for Overlap Sending. At the end of dialing, the emulated terminal receives a CALL PROCEEDING message.

If the destination emulated terminal is properly administered, then at the destination terminal interface a SETUP message containing the BC selected above will be transmitted to the terminal.

If the destination emulated terminal is not properly administered, then no SETUP message will be sent, rather a DISCONNECT message will be returned to the originating CO emulated station terminal indicating that the far end is incompatible. The tester will recognize that there has been a provisioning failure by the absence of the SETUP message, and will log the condition, and terminate the test.

At each state transition, the tester logs the progress made in traversing the Q.931 state machine at both ends of the link. Thus, after processing the SETUP message at the destination emulated terminal, the destination emulated terminal sends CALL PROCEEDING, ALERTING and CONNECT messages to the CO.

The tester at the originating emulated terminal expects to observe a CONNECT ACKNOWLEDGMENT message sent from the CO to the destination emulated terminal, and expects to observe an ALERTING message, followed by a CONNECT at the originating emulated terminal. This concludes the call establishment procedures.

The Q.931 protocol call disestablishment procedures are then initiated to deactivate the link, with the tester selecting the emulated terminal which will initiate call disestablishment procedures.

This process is repeated for each emulated terminal in turn, and with each BC associated with each such emulated terminal.

Figure 7:
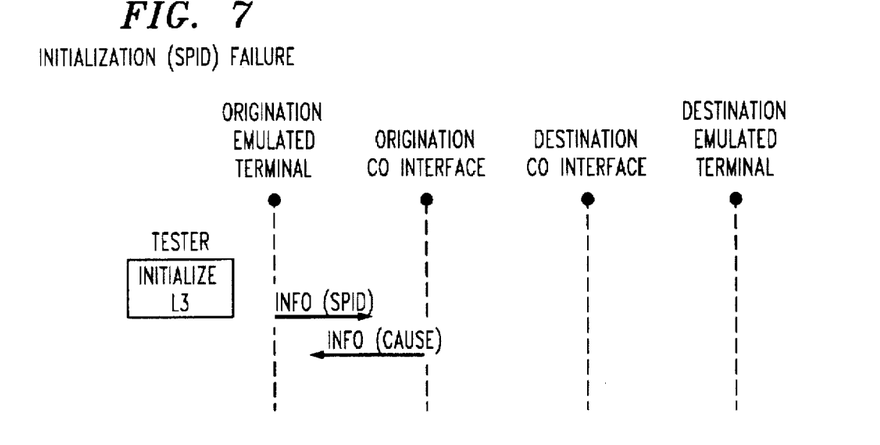
FIG. 7 illustrates a test scenario for an initialization service profile identifier (SPID) failure.

FIG. 7 illustrates a sequence of messages upon a tester initiating a provisioning test as set forth in FIG. 5 above for the situation where there is an initialization (SPID) failure. Thus, as shown, upon initializing the layer 3 protocol an INFO message including the SPID is sent from the originating emulated terminal to the central office. Since there is a failure, the INFO message coming back from the central office will include a predetermined value as set forth in the Q.931 protocol which informs the originating emulated terminal of the failure.

Figure 8:
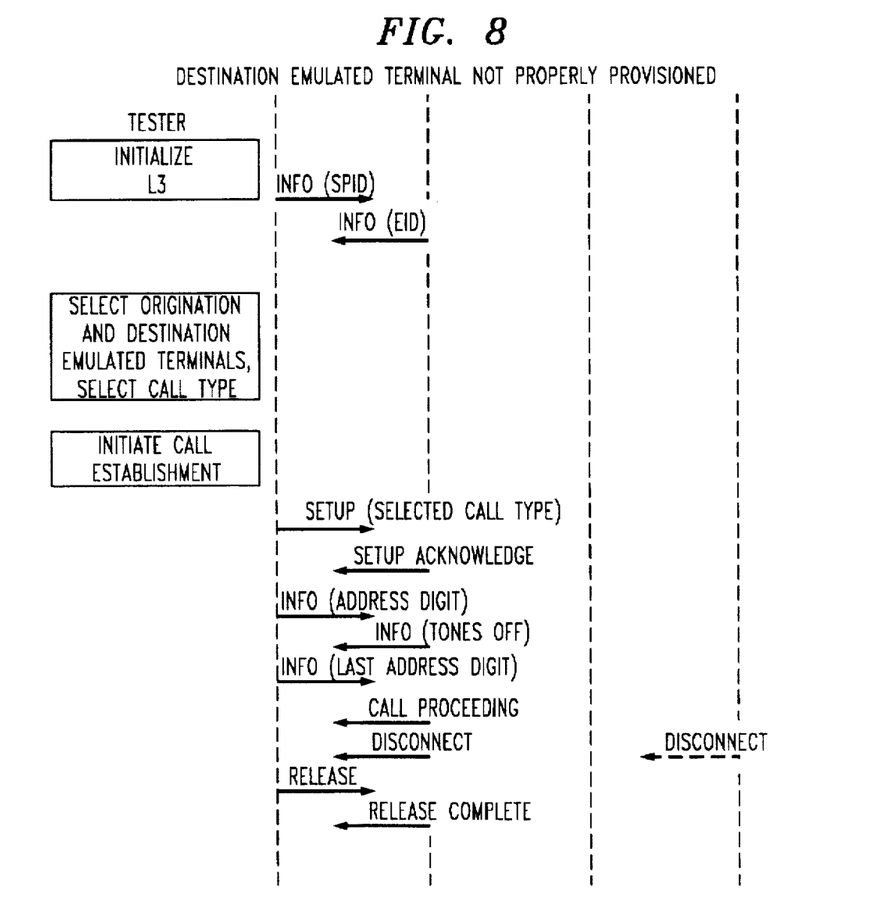
FIG. 8 illustrates a test scenario for a destination emulated CO station terminal not being properly provisioned.

FIG. 8 illustrates a sequence of messages which occur upon a tester initiating a provisioning test as set forth in FIG. 5 above for the situation in which a destination emulated terminal is not properly provisioned. For information purposes initializing layer 3 as set forth in FIG. 5 is depicted. The originating terminal again sends an INFO message including the SPID. The central office then returns an INFO message including the EID. Thereafter, the tester selects the origination and destination emulated terminals as set forth in FIG. 5 and selects the call type. Once the call type is selected, initiation of the call establishment applying the Q.931 call establishment protocols proceeds. As shown, a SETUP message for the selected call type is sent from the originating terminal. In response thereto the central office sends back a SETUP ACKNOWLEDGMENT message. Next, the originating emulated terminal sends an INFO message including an address digit to the central office. In response thereto the central office supplies an INFO message indicating that dial tone is off to the originating emulated terminal. Subsequently, the originating terminal sends INFO messages including the remaining address digits to the central office, as required. In response thereto the central office sends a CALL PROCEEDING message to the originating emulated terminal. Since the central office could not offer the requested call to the destination emulated terminal, a DISCONNECT message is sent to the originating emulating terminal causing it to disconnect the call. Then the originating emulated terminal sends a RELEASE message to the central office and in return upon the call being released, the central office sends a RELEASE COMPLETE message to the originating emulated terminal.

Figure 9:
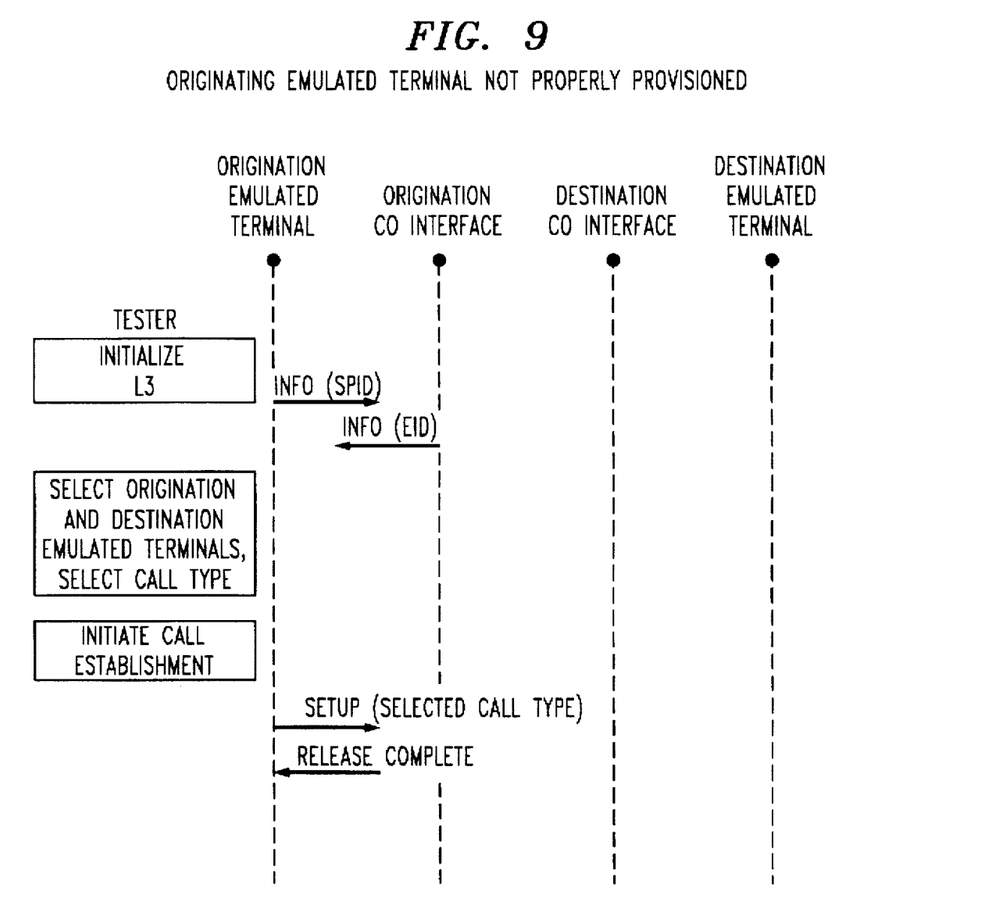
FIG. 9 illustrates a test scenario for an origination emulated CO station terminal not being properly provisioned.

FIG. 9 illustrates a sequence of messages which occur upon a tester initiating a provisioning test as set forth in FIG. 5 above for the situation in which an originating emulated terminal is not properly provisioned. For information purposes, initializing layer 3 as set forth in FIG. 5 is depicted. The originating terminal again sends INFO messages including the SPID. The central office then returns an INFO message including the EID. Thereafter, the originating emulated terminal selects the origination and destination emulated terminals as set forth in FIG. 5 and selects the call type. Once the call type is selected, initiation of the call establishment applying the Q.931 call establishment protocols proceeds. As shown, a SETUP message for the selected call type is sent from the originating emulated terminal. In response thereto the central office sends back a RELEASE COMPLETE message which indicates that the originating emulated terminal is not properly provisioned.

Figure 10:
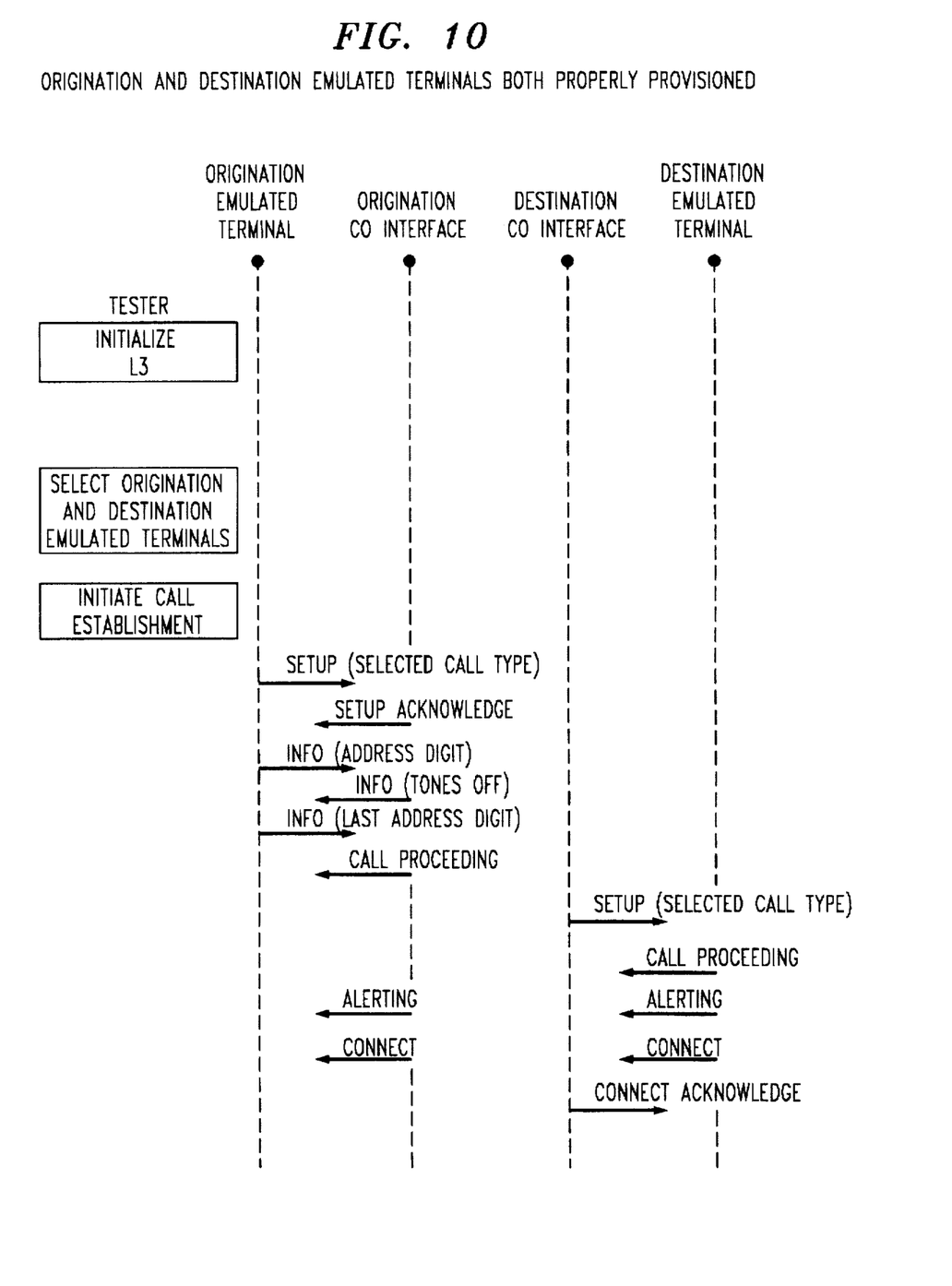
FIG. 10 illustrates a test scenario for an origination emulated CO station terminal and a destination emulated terminal both being properly provisioned.

FIG. 10 illustrates a sequence of messages which occur upon a tester initiating a provisioning test as set forth in FIG. 5 above for the situation in which origination and destination emulated terminals are properly provisioned. For information purposes, initializing layer 3 as set forth in FIG. 5 is depicted. The originating terminal again sends an INFO message including the SPID. The central office then returns an INFO message including the EID. Thereafter, the originating emulated terminal selects the origination and destination emulated terminals as set forth in FIG. 5 and selects the call type. Once the call type is selected, initiation of the call establishment applying the Q.931 call establishment protocols proceeds. As shown, a SETUP message for the selected call type is sent from the originating terminal. In response thereto the central office sends back a SETUP ACKNOWLEDGMENT message. Next, the originating emulated terminal sends an INFO message including an address digit to the central office. In response thereto the central office supplies an INFO message indicating that dial tone is off to the originating emulated terminal. Then, the originating terminal sends INFO messages including the remaining address digits to the central office. In response thereto the central office sends a CALL PROCEEDING message to the originating emulated terminal. Thereafter, the destination central office sends a SETUP message including the selected call type to the destination emulated terminal. In response thereto the destination emulated terminal sends a CALL PROCEEDING message to the destination central office. Then, the destination emulated terminal sends an ALERTING message to the destination central office which is propagated to the originating central office which, in turn, sends it to the origination emulated terminal. Thereafter, the destination emulated terminal sends a CONNECT message to the destination central office which is propagated to the origination central office and to the origination emulated terminal. Upon the call being completed, the destination central office sends a CONNECT ACKNOWLEDGE message to the destination emulated terminal.

What is claimed:

1. Premises switching apparatus for use in providing a communications connection to a digital subscriber line (DSL) which is used to provide digital connectivity to a central office (CO) switch comprising, termination means for providing a physical point-to-point connection and an emulated logical multipoint bus to said DSL, wherein communications over said DSL utilize an ISDN basic rate interface (BRI) protocol, and means for controlling said termination means and for emulating at least one BRI-compatible central office (CO) station terminal to be connected to said DSL via said emulated logical multipoint bus and for providing call control messages in order to test central office switch provisioning associated with said DSL.

2. Premises switching apparatus as defined in claim 1 wherein said test of the central office provisioning is done on a directory number basis, said directory number identifying the at least one emulated station terminal.

3. Premises switching apparatus as defined in claim 1 wherein said call control messages include a setup message identifying the call type.

4. Premises switching apparatus as defined in claim 1 wherein, when said at least one BRI-compatible central office (CO) station terminal includes a first and second BRI-compatible central office (CO) station terminal, said means for controlling includes means for selecting an origination emulated station terminal and a destination emulated station terminal.

5. Premises switching apparatus as defined in claim 4 wherein said means for controlling further included means for reversing the origination and destination emulated station terminals.

6. Premises switching apparatus as defined in claim 1 wherein said means for controlling further includes means for reporting results of said provisioning test.

7. Premises switching apparatus as defined in claim 6 wherein said means for controlling includes means for tracking progress of inbound and outbound calls.

8. Premises switching apparatus as defined in claim 7 wherein said means for controlling includes means for terminating the provisioning test.

9. A method for use in premises switching apparatus which provides a communications connection to a digital subscriber line (DSL) which is used to provide digital connectivity to a central office (CO) switch comprising the steps of, providing a physical point-to-point connection and an emulated logical multipoint bus to said DSL, wherein communications over said DSL utilize an ISDN basic rate interface (BRI) protocol, emulating at least one BRI-compatible central office (CO) station terminal to be connected to said DSL via said emulated logical multipoint bus, and providing call control messages in order to test central office switch provisioning associated with said DSL.

10. The method as defined in claim 9 wherein said test of the central office provisioning is done on a directory number basis, said directory number identifying the at least one emulated station terminal.

11. The method as defined in claim 9 wherein said call control messages include a setup message identifying the call type.

12. The method as defined in claim 9 further including the steps of selecting an origination emulated station terminal and selecting a destination emulated station terminal when said at least one BRI-compatible central office (CO) station terminal includes a first and second BRI-compatible central office (CO) station terminal.

13. The method as defined in claim 12 further including reversing the origination and destination emulated station terminals.

14. The method as defined in claim 9 further including reporting results of said provisioning test.

15. The method as defined in claim 14 further including tracking progress of inbound and outbound calls.

16. The method as defined in claim 15 further including terminating the provisioning test.

* * * * *